United States Patent

Borovoy et al.

[19]

[11] Patent Number: 5,873,107
[45] Date of Patent: Feb. 16, 1999

[54] SYSTEM FOR AUTOMATICALLY RETRIEVING INFORMATION RELEVANT TO TEXT BEING AUTHORED

[75] Inventors: Richard D. Borovoy, Boston, Mass.; Michael J. Graves, Redwood City, Calif.; Nagabhushan Rao Machiraju, Cupertino, Calif.; Sunil Vemuri, Pleasanton, Calif.

[73] Assignee: Apple Computer, Inc., Cupertino, Calif.

[21] Appl. No.: 625,486

[22] Filed: Mar. 29, 1996

[51] Int. Cl.⁶ ...................................................... G06F 17/21
[52] U.S. Cl. ................................. 707/501; 707/530; 707/3
[58] Field of Search ...................................... 395/762, 773, 395/774, 792, 793, 794, 603, 604, 615, 338; 707/501, 512, 513, 530, 531, 532, 3, 4, 104; 345/338

[56] References Cited

U.S. PATENT DOCUMENTS

| | | | |
|---|---|---|---|
| 5,276,616 | 1/1994 | Kuga et al. | 395/760 |
| 5,280,573 | 1/1994 | Kuga et al. | 395/338 |
| 5,297,039 | 3/1994 | Kanaegami et al. | 395/605 |
| 5,307,266 | 4/1994 | Hayashi et al. | 395/793 |
| 5,523,945 | 6/1996 | Satoh et al. | 395/759 |
| 5,535,382 | 7/1996 | Ogawa | 395/605 |
| 5,642,518 | 6/1997 | Kiyama et al. | 395/757 |
| 5,649,193 | 7/1997 | Sumita et al. | 395/614 |

*Primary Examiner*—Stephen S. Hong
*Attorney, Agent, or Firm*—Edward W. Scott, IV

[57] ABSTRACT

Text entry and information retrieval are combined in such a way as to automatically offer an author continuous retrieval of information potentially relevant to the text he is authoring. The author enters text in one portion of the user interface. Keywords are extracted from the text as the author enters them and are used as query words for an information retrieval mechanism to a document collection. Those queries return relevant information from the document collection in a second portion of the user interface. The user can then read or ignore the returned information or he can select the returned information to view the full context from which it came.

35 Claims, 3 Drawing Sheets

SYSTEM FOR AUTOMATICALLY RETRIEVING INFORMATION RELEVANT TO TEXT BEING AUTHORED

FIELD OF THE INVENTION

The present invention relates generally to the field of information retrieval, and more particularly to automatically retrieving information which is relevant to text being authored or topics being discussed.

BACKGROUND OF THE INVENTION

Authors benefit by researching and/or consulting other documents, including their own previous notes, when the documents are relevant to the one they are writing. Currently, the authoring process and the researching/consulting processes are separate operations involving separate tools and thought processes. The present invention combines authoring and researching/consulting in a novel way so as to dynamically offer, without deliberate action by the user, relevant notes and other documents as the user authors his own text.

Authoring text generally comprises multiple steps. The author must first decide on the subject of the text. Then any background or reference information must be located in order to be included or discussed in the text to be authored. Only then can the author begin the process of actually authoring the text, which process includes not only the more cognitive aspects of text generation but also the more mechanical aspects of spelling, grammar, layout and format. The authoring phase typically involves repeatedly referring to the previously obtained research or reference information and/or a post authoring process of reviewing the referenced information relative to the authored text in order to edit, augment or correct the text.

It is important to note that in the current text authoring process, obtaining relevant reference information is typically a pre-authoring step. Alternatively, the actual text generation process is temporarily halted while the author re-engages in the process of researching additional reference material. This researching step can range from the author searching various databases or other sources of information to the author merely locating and reviewing related material the author previously created. However, regardless of the actual sequence the typical author uses in generating text, the portion of the process dedicated to obtaining relevant material is typically a separate, dedicated process initiated and controlled or defined by the author.

Also, because researching potentially relevant information can generate considerable material, it can be difficult for an author to recall everything previously located. Furthermore, stopping to do research can be cognitively disruptive to the process of actually authoring text. What would be preferable, and what is provided by the system of the present invention, is to have relevant material merely brought to the author's attention as the author is creating the text. That way, the author can more directly focus on the text creation. Further, the author can be subtly reminded of additional reference material he may not have been aware of.

Further, while text authoring systems currently exist which automatically attempt to correct an author's spelling or grammar, it is believed that the present invention is the first system which automatically informs the user of potentially relevant material to the text being authored. Thus, other systems have provided real-time correction or input as to the mechanical authoring aspects, however no prior system is known which provides input of a cognitive substantive nature to the authoring process.

SUMMARY OF THE INVENTION

An objective of the present invention is to provide an improved method and apparatus for text authoring by automatically providing the user with existing relevant documents.

Another objective of the present invention is to provide an improved method and apparatus for text authoring which allows the user to focus more exclusively on the text authoring process rather than on the background researching process.

Still another objective of the present invention is to provide an improved method and apparatus for text authoring which subtly prompts a user about prior documents or files relevant to the text being authored.

Yet another objective of the present invention is to provide an improved method and apparatus for saving potentially relevant information related to a document being authored.

Yet still another objective of the present invention is to provide an improved method and apparatus for conversational support which prompts a conversationalist about existing documents or files relevant to the conversation being held.

The foregoing and other advantages are provided by a text authoring system comprising a data input client for authoring text, a keyword extractor for extracting a keyword from the authored text, an information source, a search engine for querying the information source using the extracted keyword, and a return of the results of the search engine querying the information source.

The foregoing and other advantages are also provided by a method of authoring text in a computer system comprising entering a portion of the text being authored, automatically identifying a keyword in the entered portion of the text being authored, searching an information source for potentially relevant documents using the identified keyword, and returning a portion of a potentially relevant document retrieved from the searched information source.

Other objects, features and advantages of the present invention will be apparent from the accompanying drawing and from the detailed description which follows.

BRIEF DESCRIPTION OF THE DRAWING

The present invention is illustrated by way of example and not limitation in the figures of the accompanying drawing, in which like references indicate similar elements, and in which.

DETAILED DESCRIPTION OF THE PREFERRED EMBODIMENT

Figure 1:
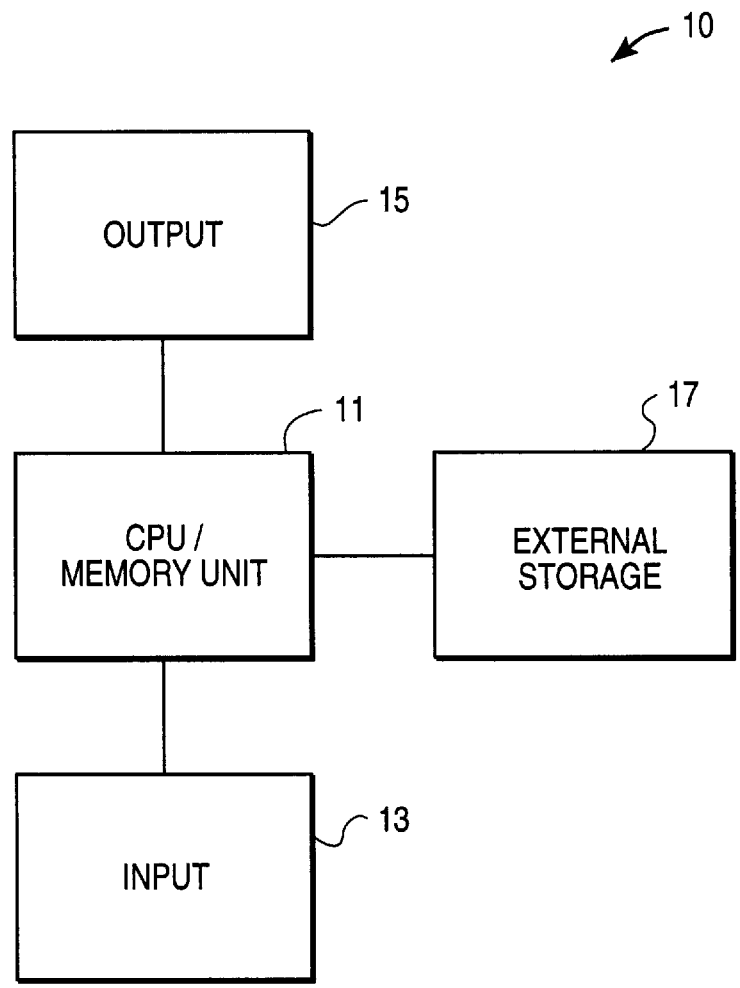
FIG. 1 is a generalized block diagram of a typical computer system 10 which might utilize the present invention.

FIG. 1 shows a generalized block diagram of a typical computer system 10 which might utilize the present invention. Computer system 10 includes a CPU/memory unit 11 that generally comprises a microprocessor, related logic circuitry, and memory circuits. Input device 13 provides inputs to the CPU/memory unit 11, which by way of example can be a keyboard, a mouse, a trackball, a joystick, a stylus, a touch screen, a touch tablet, a microphone, a telephone, a video camera, etc., or any combination thereof. External storage 17, which can include fixed disk drives, floppy disk drives, memory cards, etc., is used for mass storage of programs and data including files and documents. Output is provided by display 15, which by way of example can be a video display or a liquid crystal display. Note that for some configurations of computer system 10, an additional input may be a network connection to, for example, a local server via a local area network or to the internet and an additional output may be a loudspeaker to indicate to the user that relevant search material has been located.

As is explained more fully herein, the present invention combines text entry and information retrieval in such a way as to automatically retrieve material potentially relevant to the text being authored. In the preferred embodiment of the present invention, the author enters text in one portion of the user interface. Keywords are extracted from the text as the author enters the text and are used as query words for an information retrieval mechanism to search a collection of documents. Those queries return relevant material from the document collection in a second portion of the user interface. The user can then read or ignore the returned information or he can select it so as to view the full context from which it came.

Figure 2:
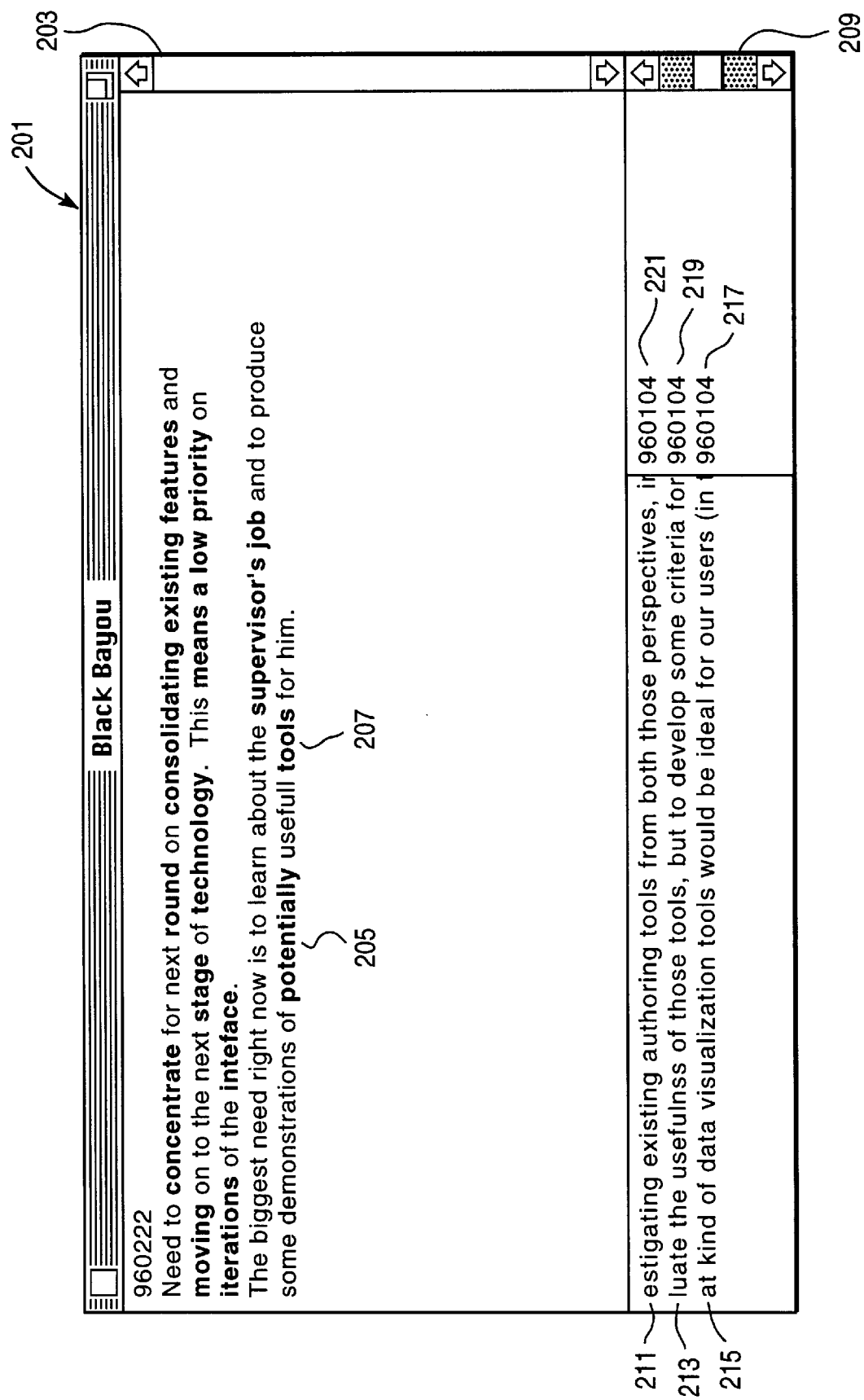
FIG. 2 is an example of a simple user interface according to one embodiment of the present invention as used in a windowing environment; and, FIG. 3 is a generalized block diagram of the components of the present invention.

FIG. 2 shows a simple user interface 201 for the present invention as could easily be implemented with any of a number of windowing type computer systems (e.g., the Apple® Macintosh® computer). The top area 203 of the window user interface 201 is the area in which the user authors text. As he does so, keywords 205, 207 are selected by the system of the present invention. These keywords are words that show up neither too frequently (stop words, as explained more fully below) or too infrequently within the collection or information source pool of available documents. Of course, these frequency criteria can be adjusted to suit user preferences or needs. As can be seen in the figure, keywords are displayed as boldface text in the preferred embodiment of the present invention.

As keywords 205, 207 are identified by the present system, each is submitted as a query to an index of the document collection. Note that the document collection can merely be those previously authored by the user, in the case of the user building on his own previous work, or can be a much larger collection as might be available in a database or on a server or even on the internet (e.g., a set of world wide web pages).

Returns of relevant text from the information source document collection are shown in the lower area 209 of the window as can be seen in the figure or, alternatively, in an entirely separate window. For example, in the figure, portions of text are returned from several documents previously authored which also mention the keyword 207 "tools". More specifically, text portion 211 of document 221 entitled "960104" (which, in this example, is also the date the document 221 was created) is shown in the first line of window area 209. Additional relevant material matching keyword 207 has likewise been retrieved as can be seen in the figure at 213/219 and 215/217, again by displaying a portion of text (213 and 215) and its associated document title (219 and 217) in window area 209.

Note that rather than only returning a document title or location of the previous mention of the keyword within the returned document, the user interface of the preferred embodiment of the present invention displays a portion of text (wherein the size of the portion could be user definable) immediately preceding and following the keyword's occurrence in the return. Thus, the first return 211/221 shown in the figure reads, "estigating existing authoring tools from both those perspectives, in o" (emphasis added). This has the added benefit of providing greater contextual cognitive information to the user than would a mere reference to a document by keyword or title. As stated above, the user interface in the preferred embodiment also displays the title of each return ("960104" in each example in the figure) and can easily be extended to include other document or keyword related information such as creation date, creator, document/file type, relevance ranking, etc.

If the user then decides he would like to view the full context of the mention of keyword 207 "tools" in one of the previous documents 211, 213, 215, in the preferred embodiment of the present invention he can select a returned portion to see the rest of the document return. Of course, any or all of the retrieved return (as well as the original portion of text returned) can be copied and pasted into the document currently being authored, or instead the user may merely wish to refresh his memory regarding the earlier entries.

As the user continues to type in the text authoring area 203, returns displayed on the basis of one keyword are ultimately replaced by those returned on the basis of another keyword. Thus, after the user has typed keyword 207 "tools" and then continues typing, as soon as he types another word recognized as a keyword, returns for that new keyword are displayed. Of course, multiple keyword returns could also be displayed.

An alternative text input means will now be described which addresses, among other possible problems, the common situation wherein a user, due to some inherent complexity in the text, might use alternative character strings to reference the same subject or concept. For example, many subjects are commonly reduced to an acronym (a word formed from the initial letters of a multi-word name) and thus may be typed by the full multi-word name or, alternatively, by the acronym. Similarly, a user may sometimes refer to a multi-word subject by using less than all of the words of that subject. The problem then arises in locating prior instances of the same subject in that some instances may be entered as the entire multi-word and in other instances may be entered by a single word or even an acronym.

The alternative text input means is provided by a set of one or more buttons which are user configurable. Allowing the user to specify what character string a given button generates avoids the user inadvertently entering differing character strings for the same subject or concept. In other words, if the user was writing about the Tennessee Valley Authority, he may type in all three words, a subset of the three words (e.g., Tennessee Valley or Valley Authority) or the acronym TVA. Rather than continually being concerned about entering the same character string, the user could merely configure a display button to consistently enter whichever variation the user desired. In that way, the user need merely press the desired button when he desired to enter text about that subject or topic and the same text character set would always be entered for that subject or topic without the user having to be concerned with text character string consistency.

Figure 3:
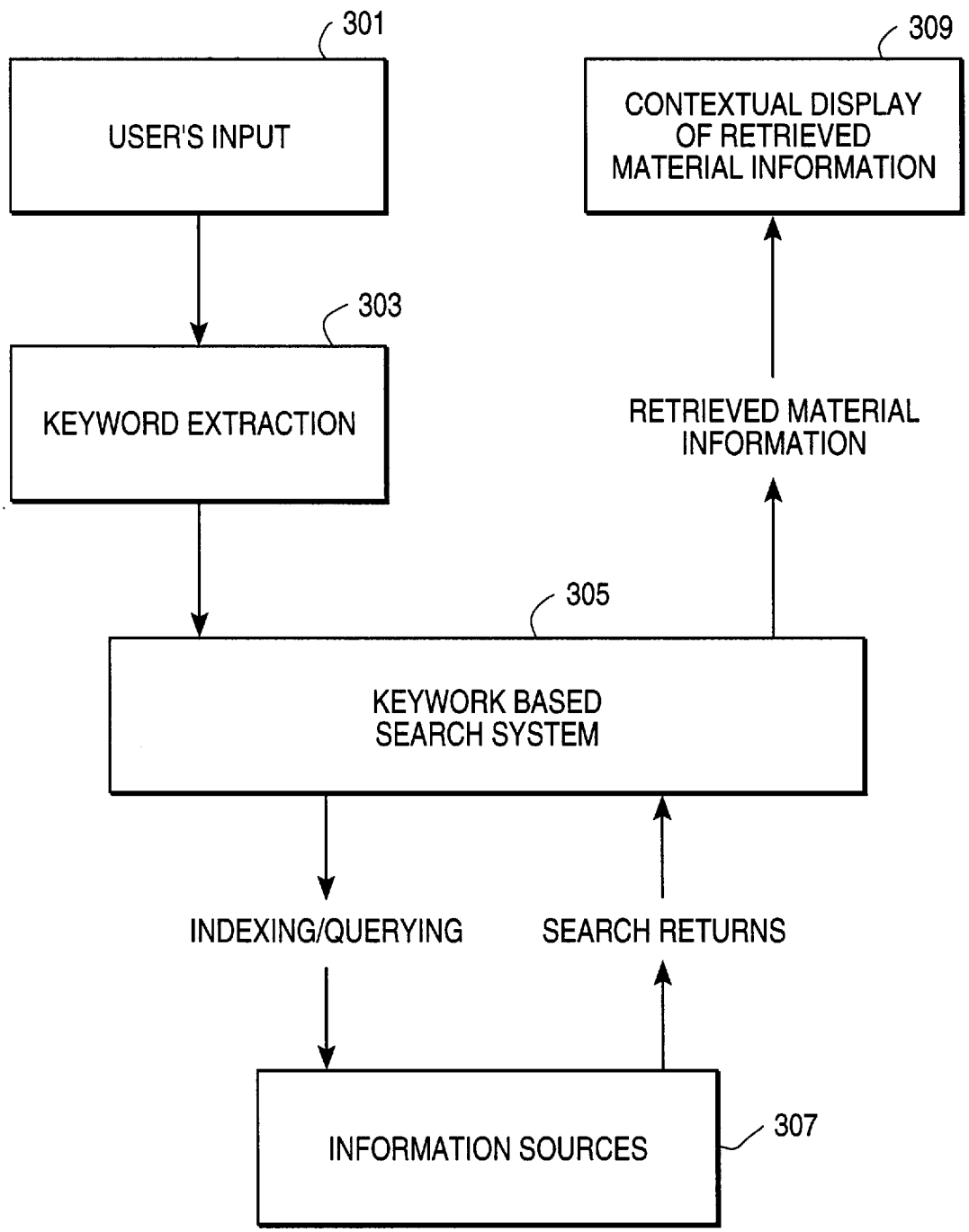

FIG. 3 shows a block diagram of the main components of the present invention. The components or processes of the present invention include: i) a data input client 301, such as a word processing application for text authoring; ii) a keyword extractor 303 (numerous algorithms for keyword extraction well known in the art exist which would work with the present invention); iii) a search engine 305 (any of a variety of existing search technologies well known in the art can be used with the present invention); iv) an information source 307 such as a repository of available text, documents or files; and, v) the output or display 309 of some or all of the potentially relevant returns.

Thus, in one embodiment, when an author enters a space, the present invention looks at the last word entered. Words that appear on a stopword list are thrown out because stopwords (words such as 'a', 'an', and 'the') contain little useful information for searching purposes. Note that an alternative embodiment may not use a stopword list and would instead just ignore such words when they naturally occur too frequently to be useful as a keyword. Remaining words are then stemmed (to eliminate variations in prefixes and suffixes of the same root word, a process well known in the art of the present invention). Note that stopwords and stemming are concepts well known in the art of the present invention. Finally, the remaining stemmed words are looked up in an inverted word index of the information source pool collection of previously authored documents.

As is well known in the art of the present invention (see, e.g., Getting Started with CPL, © 1991 Apple Computer, Inc., incorporated herein by reference in its entirety), an inverted word index is an index (much like the index in the back of a book) where individual words are listed with reference to their location within the source pool. Further, searching against a relevance ranked inverted index returns documents ordered by how closely they match the query.

Also note that determining which words to use for querying is simply a key wording problem. It is desirable to identify words that are "key" as they are being typed by the author. One way to do this is to try to determine if a word is key within the document being created. Another way to do this is to use a key word algorithm on the whole information source pool of documents to see if the word just typed shows up within the source collection as a key word. In other words, keyword determination could be made based strictly upon the document being created, the collection being searched or even a combination of the two.

Numerous well known key word algorithms utilize variations on the concept of "term frequency divided by document frequency"0 (tf/df), however, note that the present invention is equally useful with any of a large variety of key word algorithms well known in the art of the present invention (see, e.g., Malone, L. C., Wildman-Pepe, J., Driscoll, J. R., "Evaluation of an Automated Keywording System," *Microcomputers for Information Management,* vol. 7, no. 2, June 1990; and, Matsuo, F., Futamura, S., Shinohara, T., "Efficient Storage and Retrieval of Very Large Document Databases," International Conference on Data Engineering, Feb. 5–7 1986, IEEE Computer Soc. Catalog No. 86CH2261-6 pp 456–463).

Further, note that the present invention is not dependent on any particular search engine or methodology and, similarly to the key word algorithms, is equally useful with any of a large variety of searching methodologies well known in the art of the present invention (see, e.g., Salton, Gerard. *Introduction to Modern Information Retrieval,* New York: McGraw-Hill, 1983).

Lastly, display of returns can be accomplished in a large variety of ways including displaying them only after explicit user request. Of course, at a minimum, it is preferable for the system of the present invention to always indicate to the user that relevant material is available for display by, for example, modifying the display (e.g., generating or modifying a display icon) or generating a sound. That way, the user's cognitive process is not interrupted by merely having to check to see if there are relevant returns.

Additionally, note that saving returns or, at a minimum, links or pointers to returns, might prove quite useful. The author of the text just authored might later wish to review the potentially related information retrieved during the authoring process. And if the author later shares the authored text with another person, that other person may also wish to review the retrieved information. The purposes of such later review of retrieved information may vary widely just as typically occurs when one refers to footnoted material and thus may be quite useful in a variety of ways including obtaining a greater understanding of the authored text. A further benefit of saving these links to relevant information occurs when the user continues to build on previously authored works. Saving pointers to related material in a currently authored document allows retrieval of not only that authored document but also all of its related retrieved material by and during later authored documents. Thus, the present invention can also provide a historical record of multiple document creation with all of the richness of supporting documentation automatically provided.

Further, note that the document being authored may be as extensive and formal as a research paper or may be as simple and informal as a daily journal entry or e-mail message. Similarly, the information source collection searched may be a large, expansive database collection or may merely be the author's previously written journal entries or e-mail messages.

Still further, note that the present invention is equally applicable to searching and retrieving documents or files which are not strictly text based. Because audio and image based files typically have text based file names or other descriptive information associated with them, they can likewise be searched for and retrieved. One can imagine numerous possibilities where, for example, an author is writing about a particular subject and the retrieved material includes relevant still images, graphics or video clips or even a file containing a voice recording which has been "read" by a speech recognition dictation engine and can thus be determined to be relevant.

A still further input approach of the present invention utilizes voice as an alternative to typing in text. This approach could even be used as an adjunct to a conversation wherein the present invention "listens" to the conversation and then converts the voice(s) into text from which keywords can be extracted to use as search terms to a source collection. With modern personal computers having telephony and/or speech recognition/dictation capabilities, the microphone of the personal computer can be used as an input in order to convert the spoken words into keywords. Of course, a microphone isn't necessarily needed where, for example, the input is in the form of an electronically obtained audio file which itself can be converted to text from which keywords can be discerned.

Note that this input methodology would be equally applicable to situations involving a face-to-face conversation, a one-sided conversation as may occur when overhearing a telephone conversation, to a videoconference environment where the present invention may be able to "hear" anything from one to many participants/voices involved in the conversation. Further, this voice input methodology would, given the necessary processing capability and access to source material, likewise be applicable to a portable or handheld device such as an Apple PowerBook® or Newton® device which, again, would merely need to listen to a conversation to discern keywords for search purposes and then search resident or remotely available material.

Regardless of the specific environment in which a voice input embodiment is utilized, the resulting search returns, whether they be documents previously authored or created by the voice(s), relevant voice recordings from previous conversations or other forms of relevant material, would be indicated to the user in a similar manner as that discussed in the other embodiments described above.

A particular advantage of using voice input to the present invention is that, unlike drafting a document by typing in text where a particular keyword may only be relevant to a small portion of the overall document, many conversations discuss a particular subject or topic for a while before moving on to another subject or topic. As such, voice input to the present invention would likely have time to process the voice, do the resulting search and retrieve relevant hits from the collection. Additionally, voice input could have a high probability of locating any available relevant material because of the typical clustering of discussion around the relevant subject or topic by the voice(s) in the conversation speaking a variety of words relevant to that subject or topic.

In the foregoing specification, the invention has been described with reference to a specific exemplary embodiment and alternative embodiments thereof. It will, however, be evident that various modifications and changes may be made thereto without departing from the broader spirit and scope of the invention as set forth in the appended claims. The specification and drawing are, accordingly, to be regarded in an illustrative rather than a restrictive sense.

We claim:

1. A text authoring system comprising:
    a data input client for authoring text;
    a keyword extractor for extracting a keyword from the authored text;
    an information source;
    a search engine for querying the information source using the extracted keyword; and,
    a return of the results of the search engine querying the information source.

2. The system of claim 1 wherein the data input client for authoring text is a text processing program.

3. The system of claim 1 wherein the data input client for authoring text is a voice-to-text processing program.

4. The system of claim 1 wherein the keyword extractor for extracting a keyword from the authored text makes keyword determinations based on words of the authored text.

5. The system of claim 1 wherein the keyword extractor for extracting a keyword from the authored text makes keyword determinations based on words in the information source.

6. The system of claim 1 wherein the keyword extractor for extracting a keyword from the authored text makes keyword determinations based on both words of the authored text and on words in the information source.

7. The system of claim 1 wherein the information source is a collection of stored documents.

8. The system of claim 7 wherein the collection of stored documents comprises documents previously authored by the user of the text authoring system.

9. The system of claim 7 wherein the collection of stored documents comprises image oriented documents.

10. The system of claim 7 wherein the collection of stored documents is accessible by an electronic network.

11. The system of claim 7 wherein the search engine for querying the information source using the extracted keyword uses the extracted keyword to query the information source based on frequency of occurrence of the keyword within the information source.

12. The system of claim 7 wherein the return of the results of the search engine querying the information source displays a portion of a document returned from the information source.

13. The system of claim 12 wherein the portion of the document returned from the information source comprises a portion of text from the document including the extracted keyword.

14. The system of claim 12 wherein the portion of the document returned from the information source comprises information about the document.

15. The system of claim 7 wherein the return of the results of the search engine querying the information source displays an iconic display indicating returned results.

16. The system of claim 7 wherein the return of the results of the search engine querying the information source generates a sound indicating returned results.

17. The system of claim 1 wherein the return of the results of the search engine querying the information source are saved with the authored text.

18. A method of authoring text in a computer system comprising the following steps:
    entering a portion of the text being authored;
    identifying a keyword in the entered portion of the text being authored;
    searching an information source for potentially relevant documents using the identified keyword; and,
    returning a portion of a potentially relevant document retrieved from the searched information source.

19. The method of claim 18 wherein the portion of text being authored is entered via a text processing program.

20. The method of claim 18 wherein the portion of text being authored is entered via a voice-to-text processing program.

21. The method of claim 18 wherein identifying a keyword in the entered portion of the text being authored is based on words of the authored text.

22. The method of claim 18 wherein identifying a keyword in the entered portion of the text being authored is based on words in the information source.

23. The method of claim 18 wherein identifying a keyword in the entered portion of the text being authored is based on both words of the authored text and on words in the information source.

24. The method of claim 18 wherein the information source is a collection of stored documents.

25. The method of claim 24 wherein the collection of stored documents comprises documents previously authored by the user of the text authoring system.

26. The method of claim 24 wherein the collection of stored documents comprises image oriented documents.

27. The method of claim 24 wherein the collection of stored documents is accessed over an electronic network.

28. The method of claim 24 wherein the information source is searched using the extracted keyword based on frequency of occurrence of the keyword within the information source.

29. The method of claim 24 wherein returning the portion of a potentially relevant document comprises displaying text from the potentially relevant document.

30. The method of claim 24 wherein returning the portion of a potentially relevant document comprises displaying information about the potentially relevant document.

31. The method of claim 24 wherein returning the portion of a potentially relevant document comprises a graphical display.

32. The method of claim 24 wherein returning the portion of a potentially relevant document comprises generating a sound indicating returned results.

33. The method of claim 18 further comprising saving the returned portion of a potentially relevant document retrieved from the searched information source with the text being authored.

34. A program storage medium having a program stored therein for causing a computer to perform the steps of:

entering a portion of text being authored;

identifying a keyword in the entered portion of the text being authored;

searching an information source for potentially relevant documents using the identified keyword; and, returning a portion of a potentially relevant document retrieved from the searched information source.

35. A computer-based system for authoring text comprising:

means for entering a portion of the text being authored;

means for identifying a keyword in the entered portion of the text being authored;

means for searching an information source for potentially relevant documents using the identified keyword; and, means for returning a portion of a potentially relevant document retrieved from the searched information source.

\* \* \* \* \*